April 14, 1964     R. V. SCHMITT     3,128,999
RESILIENT MOUNTING
Filed Sept. 17, 1962

INVENTOR.
Regis V Schmitt
BY Ralph Hammar
Attorney

United States Patent Office
3,128,999
Patented Apr. 14, 1964

3,128,999
RESILIENT MOUNTING
Regis V. Schmitt, Erie, Pa., assignor to Lord Manufacturing Company, Erie, Pa., a corporation of Pennsylvania
Filed Sept. 17, 1962, Ser. No. 223,947
3 Claims. (Cl. 267—1)

This invention is intended to improve mountings such as shown in Patents 2,828,095 and 2,893,722. Such mountings have tubular skirts which expand radially outward under axial compression to provide load carrying shoulders. Under load, the skirts have a tendency to bell, reducing the load carrying capacity. This tendency is counteracted by internally grooving the skirts so the outer ends of the skirts buckle or fold inwardly.

Figure 1:
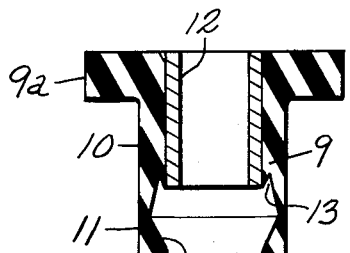
Figure 2:
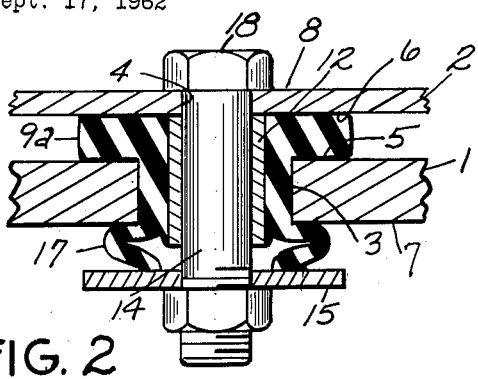
Figure 3:
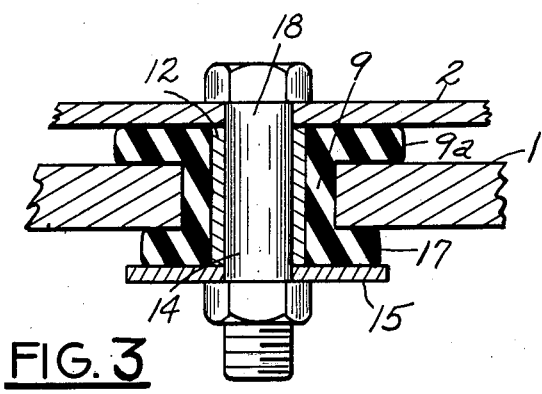
Figure 4:
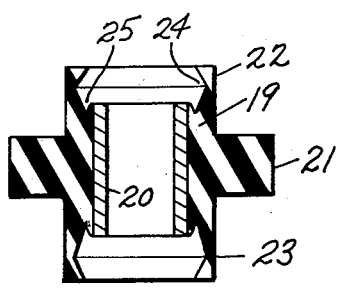
Figure 6:
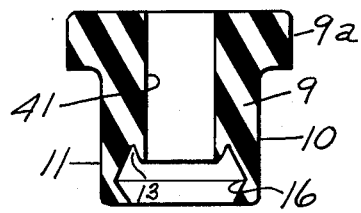
Figure 5:
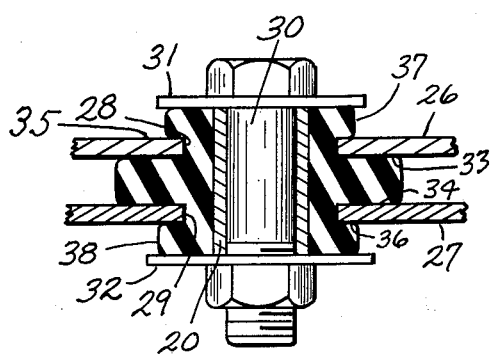
Figure 7:
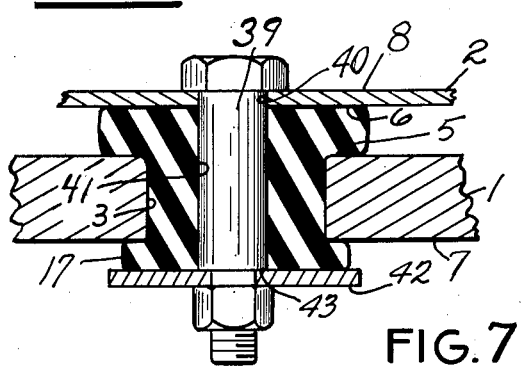

In the drawing, FIG. 1 is a section of a mounting with a skirt at one end, FIG. 2 is a section showing the mounting partially installed, FIG. 3 is a section showing the mounting completely installed, FIG. 4 is a section through the mounting having skirts at both ends, FIG. 5 is a section showing the FIG. 4 mounting installed, and FIGS. 6 and 7 are sections through a mounting for use with a shoulder bolt.

In FIGS. 1–3, 1 and 2 indicate supporting and supported members having coaxial or aligned holes 3 and 4 therein. Surrounding the holes are opposed inner load carrying surfaces 5 and 6 facing toward each other and outer load carrying surfaces 7 and 8 facing away from each other. Between the supporting and supported members is a body 9 of rubber or other suitable elastomer having a flange or collar 9a extending in load carrying relation between the opposed surfaces 5 and 6. As molded, the outside diameter of the cylindrical portion 10 of the body is such as to fit easily in the hole 3 in the member 1. In substantially direct continuation of the cylindrical portion 10 is an integral tubular skirt 11 which projects beyond the surface 7 of the member 1. At the center of the body 9 is a rigid metal sleeve 12 having its outer surface bonded or otherwise fixed to the body 9. One end of the sleeve 12 is substantially flush with the upper surface of the flange 9a. The other end of the sleeve 12 terminates beyond the surface 7 and adjacent the inner end of the skirt 11. Preferably, there is an undercut 13 adjacent the junction of the skirt 11 and the body 9 minimizing the stress on the bond between the sleeve 12 and the body 9.

In use, the body 9 is inserted in the hole 3 in the member 1 and the assembly is completed by a through bolt 14 extending through the hole 4 in the member 2 and the bore of the sleeve 12. As the bolt is tightened, a washer 15 engages the outer end of the skirt 11 and compresses it axially toward the thrust surface 7 on the member 1. The skirt has an internal radially extending circumferential groove so that axial pressure on the outer end of the skirt 11 causes the central portion of the skirt opposite the groove to buckle or bulge outwardly, providing a load carrying shoulder 17. From another aspect, the inner part of the skirt 11 buckles outwardly and the end of the skirt folds inwardly. This counteracts any tendency of the end of the skirt to bell outwardly and thereby reduce the load carrying capacity of the shoulder 17 or allow the skirt to suck back through member 2 when loads tending to decrease the distance between the surface 7 and the washer are applied.

FIG. 2 illustrates the buckling or folding action of the skirt in the partially assembled condition. In the completely assembled condition of FIG. 3, the bolt is tightened solidly against the ends of the rigid metal tube 12. This insures a controlled compression of the skirt 11. In use, load in the direction to move the members 1 and 2 closer together is transmitted from the load carrying surfaces 5 and 6 to the intermediate flange or collar 9a of the body 9. Load in the direction to move the members 1 and 2 apart is transmitted from the load carrying surface 8 to the head 18 of the through bolt 14 and from the load carrying surface 7 through the shoulder 17 to the washer 15. The inward folding of the lower end of the skirt 11 eliminates or counteracts the tendency of the shoulder 17 to bell outwardly under axial compression and thereby increases the load carrying capacity.

The mounting shown in FIGS. 4 and 5 comprises a body 19 of suitable elastomer bonded at its center to the outer surface of a rigid sleeve 20. The body has an outwardly projecting load carrying flange or collar 21 opposite the central part of the sleeve 20 and has at opposite ends axially extending tubular skirts 22, 23, the outer ends of which extend a substantial distance beyond the ends of the rigid sleeve 20. The skirts 22, 23 are internally grooved at 24 in the same manner as the skirt 11 and there is an undercut 25 between the inner end of each skirt and the adjacent end of the rigid sleeve 20. The undercut 25 has the same function as the undercut 15.

As shown in FIG. 5, the mounting is installed between supporting and supported members 26 and 27 having aligned holes 28 and 29 of substantially the same diameter as the outside diameter of the skirts 22 and 23. The skirts are easily inserted through the holes. After insertion, the assembly is completed by a through bolt 30 extending through the bore of the sleeve 20 and having washers 31, 32 which are tightened solidly against the ends of the sleeve 20. As the bolt is tightened, the washers 31, 32 compress the skirts 22, 23 axially with the same buckling or folding action as the skirt 11. In the assembled condition of FIG. 5, load in the direction to move the members 26, 27 toward each other is taken by load transmitting surfaces 33, 34 around the openings 28, 29 and is resiliently cushioned by the flange or collar 21. Load in the direction tending to move the members 26, 27 away from each other is transmitted through load transmitting surfaces 35, 36 to the shoulders 37, 38 formed by the axial compression of the skirts 22, 23.

In the mounting of FIGS. 4 and 5 there is a resilient connection to each of the supporting and supported members 26, 27. In the mounting shown in FIGS. 1–3 there is a rigid connection to the member 2 and a resilient connection to the member 1. In both mountings there is a resilient connection between the members.

FIGS. 6 and 7 show a mounting similar to FIGS. 1–3 except that the rigid metal sleeve 12 is eliminated and a shoulder bolt 39 substituted. The other parts are of the same construction and are designated by the same reference numerals. In assembly, the skirt 11 is inserted through the opening 3 in the member 1 and the shoulder bolt 39 is inserted through opening 40 in the member 2 and bore 41 in the elastomeric body 9. Upon tightening the bolt, a washer 42 is brought solidly against the shoulder 43 and the skirt 11 is compressed axially, causing the inward buckling or folding to produce the load carrying shoulder 17.

All forms of the mounting are easily assembled by inserting the tubular skirts through holes in the supporting and supported members which need not be of precision dimensions. Any looseness between the holes and the elastomer is taken up by the expansion of the elastomer as the through bolts are tightened.

The compression of the skirts is controlled by the length of the sleeves 12, 20 or by the spacing of the equivalent shoulder 43. By increasing the length of the sleeves, the skirt will be compressed less as the bolts are tightened. For example, the compression in the fully tightened position may be that shown in FIG. 2 in which case the resultant shoulder would be quite soft with a non linear spring rate. In the case of the double ended mounting of FIG. 5, lengthening the sleeve 20 so the shoulders 37, 38 appeared as illustrated in FIG. 2 would result in quite a soft mounting with a non linear spring rate and considerable amplitude.

What is claimed as new is:

1. In a resilient mounting, spaced supporting and supported members each having a hole therein and the holes being aligned with each other, said members having opposed inner load carrying surfaces surrounding the respective holes and facing toward each other and having outer load carrying surfaces also surrounding the respective holes and facing away from each other, a through bolt extending through said holes with an associated thrust surface presented toward each of said outer surfaces and an associated rigid section clamped between said thrust surfaces when the bolt is tightened, a body of elastomer arranged in load carrying relation between said inner surfaces and surrounding said rigid section, said body having at at least one end a tubular skirt extending through one of said holes and beyond the outer surface surrounding said one hole and having its outer part engaging the associated thrust surface of said bolt, said skirt having an internal radially extending circumferential groove between the outer surface surrounding said one hole and the associated thrust surface of said bolt to cause the inner part of the skirt to buckle outwardly and the end of the skirt to fold inwardly as the bolt is tightened thereby providing a resilient shoulder in load carrying relation between the outer surface surrounding said one hole and the associated thrust surface of said bolt.

2. The mounting of claim 1 in which the associated rigid section comprises a rigid tube surrounding the bolt with the outer surface of the tube bonded to said body.

3. The mounting of claim 1 having a skirt at both ends respectively extending through one and the other of said holes and beyond the outer surface of the hole through which it projects, each skirt having its outer part engaging the associated thrust surface of said bolt, and each skirt having an internal radially extending circumferential groove between the outer surface of the hole through which it projects and the associated thrust surface of said bolt to cause the inner part of the skirt to buckle outwardly and the end of the skirt to fold inwardly as the bolt is tightened thereby providing a resilient shoulder in load carrying relation between the outer surface and the associated thrust surface.

References Cited in the file of this patent

UNITED STATES PATENTS

| | | |
|---|---|---|
| 2,828,095 | Beck et al. | Mar. 25, 1958 |
| 2,893,722 | Beck | July 7, 1959 |